United States Patent [15] 3,637,167
Froning, Jr. et al. [45] Jan. 25, 1972

[54] MISSILE STEERING SYSTEM

[72] Inventors: Herman D. Froning, Jr., Santa Monica; Dean F. Hopkins, Los Angeles; Paul L. Klevatt, Woodland Hills, all of Calif.

[73] Assignee: McDonnell Douglas Corporation

[22] Filed: Nov. 5, 1969

[21] Appl. No.: 874,218

[52] U.S. Cl. .................................... 244/3.21, 244/3.22
[51] Int. Cl. ........................................... F42b 15/16
[58] Field of Search ......................... 244/3.22; 102/34; 60/228–232

[56] References Cited

UNITED STATES PATENTS

| | | | |
|---|---|---|---|
| 3,282,541 | 11/1966 | Webb | 244/3.22 |
| 2,692,475 | 10/1954 | Hull | 244/3.22 X |
| 3,276,376 | 10/1966 | Cubbison et al. | 244/3.22 |
| 2,968,454 | 1/1961 | Merrill et al. | 244/3.22 |

*Primary Examiner*—Robert F. Stahl
*Attorney*—Walter J. Jason, Donald L. Royer and Robert O. Richardson

[57] ABSTRACT

A missile steering system wherein high maneuverability of a missile is achieved by combined interaction of jet exhaust and movable fins on fluid flow past the missile surface. Jet exit ports are located between movable fins and selected ones are used in various steering maneuvers.

4 Claims, 6 Drawing Figures

PATENTED JAN 25 1972

INVENTORS
HERMAN D. FRONING JR.
DEAN F. HOPKINS
PAUL L. KLEVATT
BY Robert O. Richardson
ATTORNEY INVENTORS
HERMAN D. FRONING JR.
DEAN F. HOPKINS
PAUL L. KLEVATT
BY Robert O. Richardson
—ATTORNEY—

MISSILE STEERING SYSTEM

BACKGROUND OF THE INVENTION

Current air-air armament systems (which include guns, rockets and guided missiles) possess insufficient capability to intercept and destroy high-speed, highly maneuverable enemy aircraft in short range air-air combat situations. There is a need for an extremely agile air-launched weapon (guided missile) that is capable of coping with such high-performance enemy aircraft by making extremely rapid heading changes, generating extremely large lift maneuvers, and thereby placing the missile within the lethal radius of its warhead despite high target speed and evasive maneuver. More specifically, there is a need to generate high control forces in the flight environment quickly and accurately for effective steering of the missile in response to guidance commands.

Current steering systems use aerodynamic surfaces alone. These have insufficient effectiveness at low velocities and at high altitude to achieve the desired maneuvers because of insufficient airflow over the surfaces. Missile configurations employing large span all-movable wings placed very near the missile center of gravity, can generally provide the normal forces required for high maneuverability. However, these configurations accrue weight and drag which affect the overall missile performance. Also, missile maximum angle of attack capability with a large span winged configuration, is limited due to pitch, roll and yaw coupling problems. A movable nozzle on an axial propulsion system, which will control the direction of the axial thrust, will give improved maneuverability but only while the propulsion motor is operating. This short period after launch (only a few seconds), is not effective after burnout and during the rest of the flight.

SUMMARY OF PRESENT INVENTION

The missile steering system of the present invention utilizes internally generated gas jets located between movable fins about the periphery of the missile. When selected ports are activated, the jet exhaust penetrates into the airstream in a transverse direction. This generates a jet reaction thrust, jet interaction force, and aerodynamic forces from the deflected fins, all of which contribute to higher maneuverability steering. The gas jets may operate independently of the main propulsion unit and may be used at any time throughout the flight. During flight periods when less drastic turning is required, the reaction jets need not be operated, thus reducing the total propellant supply needed for the system.

The use of jets interdigitated between movable aerodynamic surfaces results in greater maneuverability over a longer range than heretofore possible. This permits operation at higher angles of attack and provides a fast response to guidance signals since the jets can be activated very rapidly.

In one embodiment the missile is made tail heavy, with the center of gravity positioned rearwardly of its center of pressure in flight. This gives the missile a natural tendency to turn rapidly around in flight, giving the missile a quick response in deviating from a straight line course of flight. The steering system of the present invention may be used, in such case, for stabilizing purposes and to stop the missile from continuing its turning. Less energy, quicker response and greater agility may be achieved in stabilizing an existing turn than in initiating a turn.

Figures 1, 2:
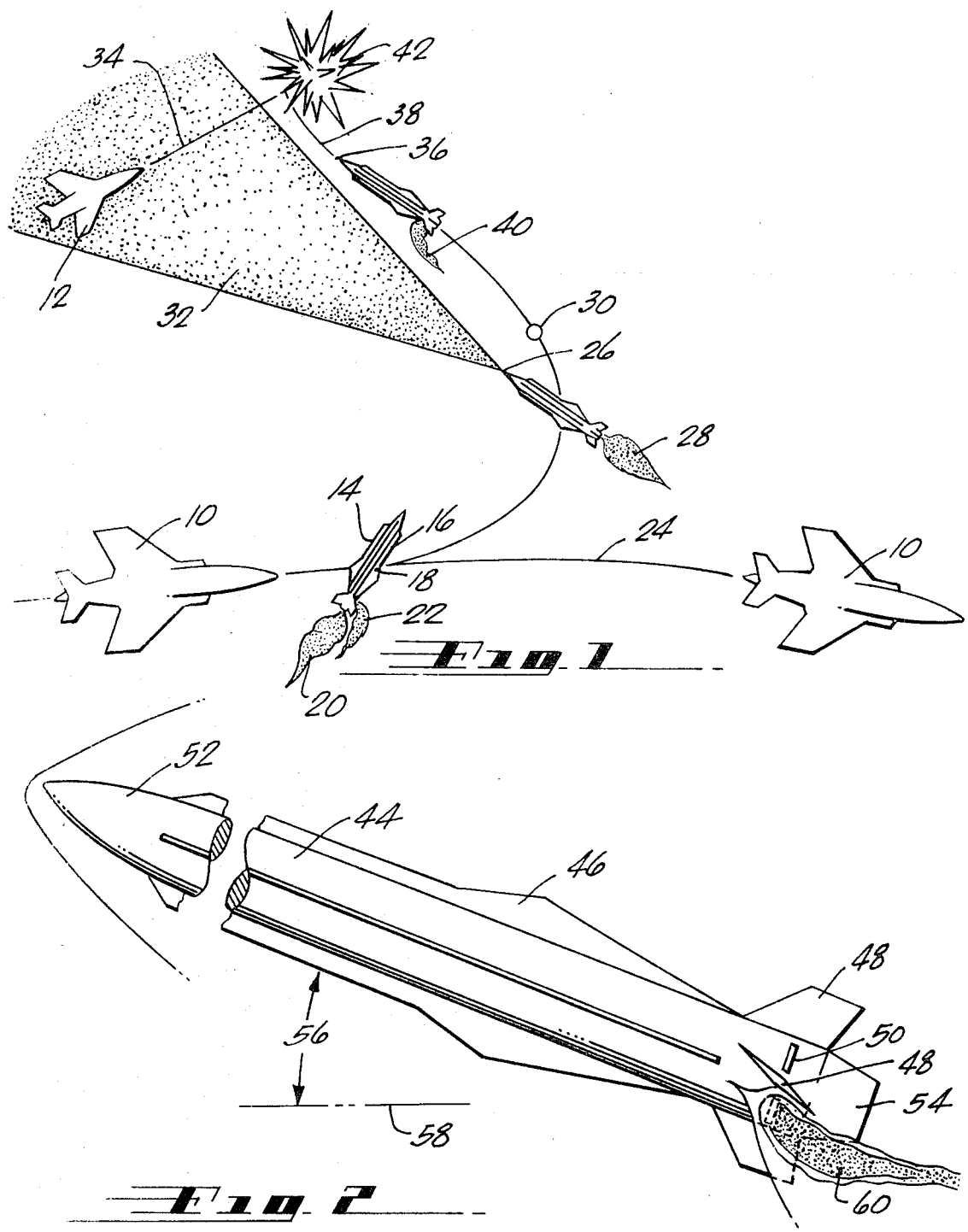
FIG. 1 is a graphic illustration of the missile quick turn problem resulting in the present invention.
FIG. 2 is an elevational view of a missile having jet nozzles and movable aerodynamic surfaces.

Reference is now made to FIG. 1 wherein there is shown an aerial launch vehicle 10 and an aerial target 12. Target 12 is at a distance, is in a position and is following such a course as to require a weapon 14 launched from vehicle 10 to engage in quick turning and violent maneuvering in order to deflect from its course and intercept the target. Missile 14, first shown at its initial turn point, is so designed that it has a center of pressure 16 forwardly of its center of gravity 18 and thus is considered to be tail heavy. The missile flies at an angle of attack relative to its flight path and in this unstable condition, it will tend to rotate rapidly. This natural tendency of the missile accelerates its angular attitude relative to its flight path and immediately starts a turn. The illustration of jet flame 20 rearwardly indicates that the rocket motor of the missile is still active at this initial turn point. Extending outwardly at one side of the rear section of the missile is another jet stream 22 which is used to partially compensate for this instability and to prevent the missile from rotating completely around. It thus goes into a very tight turn, as shown. The launch vehicle 10 continues on in its normal flight path as shown by line 24 while the missile continues its tight turn to a position shown at 26. In this position there is still shown an exhaust flame 28 since it has not yet reached its burnout point 30. At point 26, the target 12 is within the seeker scan view 32 which defines an area within the front view of the missile. The missile may home in upon and intercept any target within this area. As the target 12 proceeds along its flight path line 34, it is "on target" for the missile which then at point 36 makes its terminal maneuver. The target seeking apparatus and guidance system of the missile directs it to make a slight movement to the right as shown by the curve line 38. Once again, the instability of the missile causes it to tend to fly tail first and a compensating jet stream shown at 40 prevents such tail first maneuver but permits it to follow the course line 38 to make an interception with the target at point 42.

During the major portion of most air-to-air intercepts, satisfactory high control forces and maneuver levels can be generated by the deflection of aerodynamic surfaces. However, in the short range air-to-air combat missions such as that just described, there are two crucial short duration portions of the intercept where this aerodynamic control force capability may be insufficient. The first is at the initial turn phase where the missile must execute very quick and violent turn maneuvers right after launch to cancel very large heading angles between the missile and the target. The second time is at the terminal phase, such as at point 36, where the missile must execute very quick and violent maneuvers to counter desperation target evasion maneuvers. At the first stage where the rocket motor is still burning, the missile might be constructed so that some of this energy might be used for the lateral deflection, shown by the jet stream 22. However, at the terminal maneuver point 36, near the end of the flight path, a post burnout control subsystem must be used.

The missile steering system of the present invention, which makes possible the maneuverability illustrated in FIG. 1, and in particular during the two crucial short duration maneuver intervals previously mentioned, is provided by an on demand jet reaction steering control system. The control forces generated by this system may be considered as the basic reaction force of blowing jets and additional forces caused by the interaction of the jets with the external airstream passing over the missile. Small span aerodynamic surfaces are employed to facilitate extremely rapid movement of the missile to a high angle of attack. These small surfaces also provide minimum missile drag penalties.

Referring now to FIG. 2 there is shown a missile air frame 44 having a typical aerodynamic configuration with a plurality of fixed fins 46 and movable aerodynamic surfaces 48 which, in this case, are tail fins horizontally and vertically spaced to form four quadrants. Within each of these four quadrants and spaced longitudinally within the latter half of the length of the fins, are elongated jet nozzle openings 50. The nose section 52 is lighter in weight than the tail section 54 and the shape of the missile is such that the center of pressure of the missile in flight is ahead of its center of gravity so that the missile tends to rapidly rotate to a large angle with respect to the airstream. This results in sharp, fast maneuverability, provided turn compensation is made immediately after the commencement of the turn. This compensation is made by the laterally projecting jet streams between selected fins and by proper rotation of selected fins to achieve the desired deflection. The missile has an angle of attack shown by double pointed arrow 56 between its flight path 58 and its longitudinal axis. With its unstable condition, this angle of attack would get progressively greater except for the rotation of selected fins 48 and the jet stream 60 from a selected jet nozzle opening 50 which establishes a compensating force, permitting a sharp angle turn or climb as desired.

Figure 3:
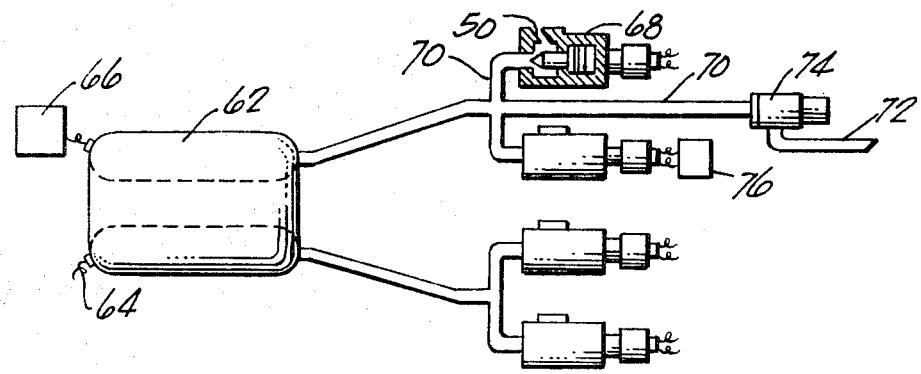
FIG. 3 is a schematic illustration of a gas generator system for energizing selected jet nozzles.

One such means of generating a jet stream from selected nozzles is shown in the schematic illustration in FIG. 3. Here an annular gas generator 62 with a solid propellant therein is provided and may be energized by igniters 64 from an appropriate electrical signal source 66, programmed by an appropriate guidance system, not shown. Four valves 68 are provided in the lines 70 which transport the gas to their respective jet nozzle openings 50. Since the gas generator operates continuously to burnout from launch time, a vent 72 and pressure relief valve 74 is connected to the lines 70 to exhaust the gases rearwardly until such time as deflection forces are needed. Control valves 68 are selectively and separately energized from an appropriate signal source 76 permits exit of burning gases through selected jet nozzles 50. As an alternate method, a portion of the missile propulsion gases may be diverted through selected jet nozzles until burnout and thereafter an independent gas source may be used. The jet nozzles may be used to assist the fins in initiating a turn in selected applications and then used in the reverse direction to stabilize the turn and to compensate for overreaction of the missile to the initial turn commands.

Figures 5, 6:
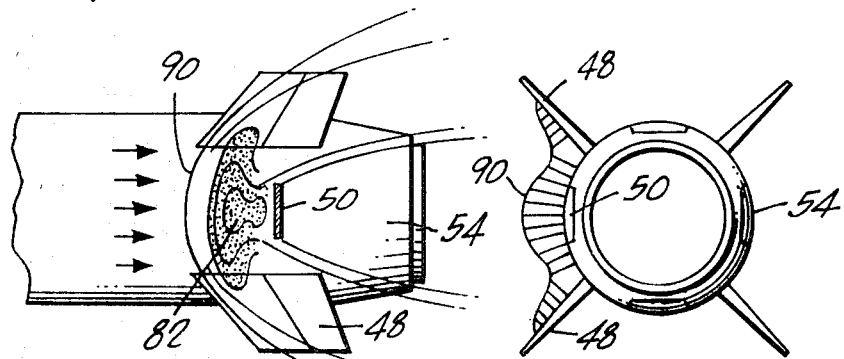
FIGS. 4, 5 and 6 are schematic illustrations of the jet interaction flow field about the missile.
Figure 4:
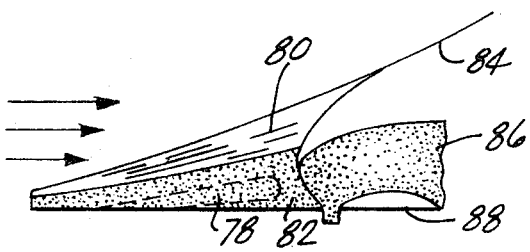

FIGS. 4, 5 and 6 show the jet interaction flow field. The side view in FIG. 4 of the interaction region shows a large separated region 78 forward of the jet nozzle exit which results from the deflection of the supersonic external stream 80. A pressure rise 82 occurs in the separated region to support the boundary layer separation. The shock system consists of an oblique separation shock 84 which emanates from the boundary layer separation and a layer bow shock immediately forward of the jet flow. The lower end of the bow shock is nearly normal to the flow and induces a further pressure rise in the separated region of the nozzle lip. Downstream of the jet 86 a second separated region 88 exists which is a low pressure region formed on the lee side of the jet. Pressures in this region are usually below the local static pressure and thus result in unfavorable pressure area forces. In plan view, as shown in FIG. 5, the lateral spread of the interaction region is many times greater than the length of the slot nozzle 50, itself. Immediately behind the shock is a high-pressure ridge 82 which diminishes in strength as the shock spreads out. FIGS. 5 and 6 depict the favorable interaction pressure forces 90 which can occur on aerodynamic fins 48 when used in conjunction with the jet reaction nozzles 50. With the jet nozzle 50 placed between the fins 48, the fins tend to channel the airflow over the nozzle and this results in a more nearly two-dimensional flow. The jet reaction steering operates as a secondary system, augmenting the aerodynamic control during the time of required high "G" maneuvering which occurs most likely during the initial launch period and near the end of the flight. For the most part of the flight, sufficient control is available from the aerodynamic fins which are also available to provide roll control. The jet reaction steering system may be considered as providing the large or coarse corrections while the aerodynamics system provides the fine or accurate heading changes. For simplicity, the jet reaction system can operate in a pulsing mode while the aerodynamic control is a fully proportional system.

It can be seen in references FIGS. 2, 4 and 5 that the fins channel surface air over the jet openings to make them more effective. More air over the jets cause a greater pressure in the jet interaction region in front of the jets and this gives greater control force for the same amount of jet mass flow. The blowing jets also have an effect on the fins. When the jet flow is on, it flows over the fin surfaces, creating a greater mass of airflow over the fins and thus creating greater aerodynamic forces over the fins. Accordingly, there is a greater steering control in the combination of jets and fins than would normally be expected by simply adding the individual effects of each.

Having thus described one embodiment of the present invention, it will at once become obvious to one skilled in the art that many improvements and modifications are possible, and it is to be understood that these variations from that shown and described, are also to be considered as part of the present invention.

We claim:

1. A missile steering system comprising:
   a tail heavy missile having its center of pressure forwardly of its center of gravity,
   said missile flying at an angle of attack relative to its flight path,
   aerodynamic fins equally spaced in quadrants and movably connected to the tail section of said missile,
   jet nozzle slot openings in said tail section extending in a circumferential direction about said missile between said fins,
   a gas source connected to said openings,
   means for moving selected fins as desired, and
   means controlling gas flow to selected openings.

2. A missile steering system as in claim 1 wherein said gas source includes missile propulsion gases for use before burnout and an independent gas source for use after burnout.

3. A missile steering system as in claim 1 wherein fin movement and gas flow to certain nozzles is used to initiate turning movement and gas flow to other nozzles is used to compensate for overreaction of said missile in making rapid turns.

4. A missile steering system as in claim 1 wherein said gas source is a source independent from the missile propulsion source and is generating gas continuously from launch, and valve means directing said gases rearwardly and for directing gases to selected jet nozzles.

* * * * *